(12) United States Patent
Liang et al.

(10) Patent No.: US 11,897,988 B2
(45) Date of Patent: Feb. 13, 2024

(54) HYDROGENATED STYRENE/CONJUGATED DIOLEFIN COPOLYMER, FOAMING MATERIAL THEREOF, AND APPLICATION THEREOF

(71) Applicant: CHINA PETROLEUM & CHEMICAL CORPORATION, Beijing (CN)

(72) Inventors: Hongwen Liang, Beijing (CN); Xiaojun Mo, Beijing (CN); Wangming Li, Beijing (CN); Chaozhou Liu, Beijing (CN); Fan Yang, Beijing (CN); Zheng Kang, Beijing (CN); Xu Wang, Beijing (CN); Zhenyin She, Beijing (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 494 days.

(21) Appl. No.: 17/286,919

(22) PCT Filed: Oct. 29, 2019

(86) PCT No.: PCT/CN2019/114015
§ 371 (c)(1),
(2) Date: Apr. 20, 2021

(87) PCT Pub. No.: WO2020/088454
PCT Pub. Date: May 7, 2020

(65) Prior Publication Data
US 2021/0371564 A1  Dec. 2, 2021

(30) Foreign Application Priority Data
Oct. 30, 2018 (CN) .......................... 201811281317.1

(51) Int. Cl.
| | | |
|---|---|---|
| A43B 13/04 | (2006.01) |
| C08F 236/06 | (2006.01) |
| C08F 236/10 | (2006.01) |
| C08F 8/04 | (2006.01) |
| C08J 9/12 | (2006.01) |

(52) U.S. Cl.
CPC ............. *C08F 236/10* (2013.01); *C08J 9/122* (2013.01); *C08J 2203/06* (2013.01); *C08J 2309/06* (2013.01)

(58) Field of Classification Search
CPC ....... C08F 8/04; C08J 2309/06; C08J 2325/10
See application file for complete search history.

(56) References Cited

U.S. PATENT DOCUMENTS

| | | | |
|---|---|---|---|
| 5,132,372 A * | 7/1992 | Chamberlain | .......... C08C 19/02 |
| | | | 525/333.1 |
| 6,005,050 A | 12/1999 | Okada et al. | |
| 6,310,112 B1 * | 10/2001 | Vo | .............. C08J 9/14 |
| | | | 521/149 |
| 8,541,504 B2 | 9/2013 | Kusanose et al. | |
| 9,493,623 B2 * | 11/2016 | Shimizu | ................. A43B 13/04 |
| 2009/0312449 A1 | 12/2009 | Sasaki et al. | |
| 2011/0204536 A1 * | 8/2011 | Liang | .................... C08F 236/10 |
| | | | 526/87 |
| 2018/0201065 A1 * | 7/2018 | Adachi | ............... C08K 5/0025 |
| 2018/0207983 A1 * | 7/2018 | Adachi | ................. B60C 1/0025 |

FOREIGN PATENT DOCUMENTS

| | | |
|---|---|---|
| CN | 1844178 A | 10/2006 |
| CN | 102786621 A | 11/2012 |
| CN | 102083872 B | 11/2013 |
| CN | 102786621 B | 12/2014 |
| CN | 104379667 A | 2/2015 |
| CN | 108219090 A | 6/2018 |
| EA | 200401438 A1 | 6/2005 |
| EP | 0 027 312 A1 | 4/1981 |
| EP | 0 919 590 A1 | 6/1999 |
| EP | 2632963 B1 | 8/2015 |
| EP | 2 676 981 B1 | 6/2018 |
| JP | H02-272004 A | 11/1990 |
| JP | H04-139219 A | 5/1992 |
| JP | 2011094074 A | 5/2011 |
| WO | 0027615 A1 | 5/2000 |
| WO | 2003/066697 A1 | 8/2003 |

OTHER PUBLICATIONS

Examination Report dated Aug. 6, 2021, by the Intellectual Property India—Government of India in corresponding Indian Patent Application No. 202137019346, with an English translation of the Examination Report. (6 pages).

(Continued)

*Primary Examiner* — Melissa A Rioja
(74) *Attorney, Agent, or Firm* — BUCHANAN INGERSOLL & ROONEY PC

(57) ABSTRACT

Disclosed are a hydrogenated styrene/conjugated diolefin copolymer, a foaming material thereof, and application thereof. The copolymer contains a styrene structure unit and a hydrogenated conjugated diolefin structure unit; by taking the total content of the copolymer as a reference, the content of the styrene structure unit is 15-50 wt %, the content of 1,2-polymerization structure unit in the hydrogenated conjugated diolefin structure unit is 8-32%, the degree of randomness of the styrene structure unit in the hydrogenated conjugated diolefin structure unit is 30-80%, and the degree of hydrogenation of conjugated diolefin in the copolymer is 85-100%. The tensile strength at break of the hydrogenated styrene/conjugated diolefin copolymer is 30-60 MPa, the elongation at break is 300-600%, and the hardness (Shore A) is 70-98. Moreover, a foaming body having excellent performance including more than 60% rebound and less than 30% compression deformation can be manufactured by using a supercritical carbon dioxide foaming process.

19 Claims, 3 Drawing Sheets

(56) References Cited

OTHER PUBLICATIONS

The Extended European Search Report dated May 25, 2022, by the European Patent Office in corresponding European Patent Application No. 19878283.1. (5 pages).
English translation of a Patent Search Report dated Dec. 22, 2021, by the Federal Service for Intellectual Property (ROSPATENT) in corresponding Russian Patent Application No. 2021113645/04(028904). (2 pages).
Dissertation by Bui Tien Dung, "New segmented block copolymers based on hard and soft segments using selectively reacting bifunctional coupling agents," der Fakultät für Mathematik und Naturwissenschaften der Technischen Universität Dresden, 2007. (125 pages).
International Search Report (PCT/ISA/210) with an English translation, and Written Opinion (PCT/ISA/237) dated Jan. 23, 2020, by the China National Intellectual Property Administration as the International Searching Authority for International Application No. PCT/CN2019/114015.
Office Action dated May 17, 2022, by the Japanese Patent Office in corresponding Japanese Patent Application No. 2021-523405. (5 pages).
Notice of Reasons for Refusal dated Oct. 31, 2023, by the Japanese Patent Office in corresponding Japanese Patent Application No. 2022-164820, and an English translation of the Notice (6 pages).

* cited by examiner

HYDROGENATED STYRENE/CONJUGATED DIOLEFIN COPOLYMER, FOAMING MATERIAL THEREOF, AND APPLICATION THEREOF

FIELD

The present disclosure relates to the technical field of preparing high molecular polymer, and particularly to a hydrogenated styrene/conjugated diolefin copolymer, a foaming material obtained from foaming of the copolymer, and use thereof.

BACKGROUND

Hydrogenated styrene/butadiene block polymer ("SEBS" for short), hydrogenated styrene/isoprene block polymer ("SEPS" for short), hydrogenated styrene/isoprene and butadiene block polymer ("SEEPS" for short) have been widely applied in a variety of consumer electronic products, automobiles, building materials, tools, daily necessities and the like, and exhibited the outstanding characteristics such as low modulus, high tensile strength (15-38 MPa), excellent elastic recovery and desirable aging resistance. However, in some application scenarios requiring high tensile modulus and compression modulus, low hardness and high filling (e.g., foamed shoe soles, artificial leather and electric wires), the traditional hydrogenated styrene/conjugated diolefin block polymer is difficult to meet the requirements, when these products are produced with the materials having low tensile modulus, large deformation is needed to generate the required stress, thus the sole has insufficient rebound force, the surface layer and the cloth layer of the artificial leather are prone to separate, the copper wires of the electric wires break before the surface layer, and the like. The foaming sole produced with ethyl vinyl acetate (EVA) has the problems such as being askew after compression, poor slip resistance, and the artificial leather produced by using soft polyvinyl chloride (PVC) or polyurethane (PU) has problems in regard to environmental pollution and emission of toxic volatile organic compounds (VOCs) during use.

At present, some shoe factories use conventional SEBS for foaming to manufacture midsoles for shoes sold on the market, the obtained foamed soles has better rebound performance than the EVA (the compression ratio is within a range of 30%-35%, and the rebound rate is as high as 50%), but the conventional SEBS has the defects that the foaming products have uneven foam holes due to low melt viscosity, and even causes large compression deformation resulting from partial rupture of the foamed soles. In addition, a chemical foaming method is generally required for foaming.

CN102083872B discloses a method for preparing a styrene-butadiene copolymer by controlling the feed rate, such that the monomer is consumed in the polymerization at a rate equivalent to or greater than the addition rate of said monomer, and controlling a difference between the maximum reaction temperature and the initiation temperature to be not more than 50° C., thereby prepare a copolymer comprising a micro-block of styrene monomer and a micro-block of conjugated diolefin monomer. The copolymer must be chemically cross-linked with EVA to obtain a material with higher rebound elasticity and lower compression deformation.

SUMMARY

The present disclosure aims to provide a hydrogenated styrene/conjugated diolefin copolymer which can obtain higher rebound elasticity and lower compression deformation without performing a chemical foaming process, a foaming material obtained from the copolymer, and uses thereof.

A first aspect of the present disclosure provides a hydrogenated styrene/conjugated diolefin copolymer, wherein the copolymer comprises a styrene-based structural unit represented by Formula 1, a hydrogenated conjugated diene-based structural unit represented by Formula 2 and/or by Formula 3,

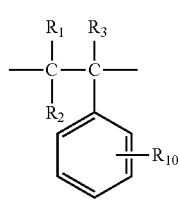

Formula 1

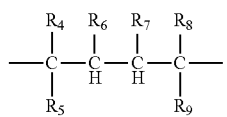

Formula 2

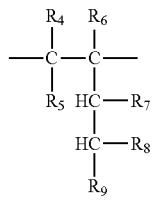

Formula 3

Wherein $R_1$, $R_2$, $R_3$, $R_4$, $R_5$, $R_6$, $R_7$, $R_8$ and $R_9$ are respectively H, $C_1$-$C_3$ alkyl, and $R_{10}$ is H or $C_1$-$C_4$ alkyl; the content of the styrene-based structural unit is 15-50 wt %, preferably 18-45 wt %, based on the total amount of the copolymer; the content of the hydrogenated conjugated diene-based structural unit represented by Formula 3 is 8-32 wt %, preferably 10-30 wt %, more preferably 12-25 wt %, based on the total amount of the hydrogenated conjugated diene-based structural unit represented by Formula 2 and the hydrogenated conjugated diene-based structural unit represented by Formula 3, the randomness degree of the styrene-based structural unit in the hydrogenated conjugated diene-based structural unit is 30-80%, preferably 35-75%, and the hydrogenation degree of the copolymer is 85-100%, preferably 95-100%.

A second aspect of the present disclosure provides a hydrogenated styrene/conjugated diolefin copolymer foaming material obtained by foaming the aforementioned hydrogenated styrene/conjugated diolefin copolymer.

A third aspect of the present disclosure provides a use of the hydrogenated styrene/conjugated diolefin copolymer and foaming material in the preparation of foamed shoe soles.

The hydrogenated styrene/conjugated diolefin copolymer provided by the present disclosure has a tensile strength at break within a range of 30-60 MPa, an elongation at break within a range of 300-600% and the hardness (Shore A) within a range of 70-98, the copolymer is an elastomer with highstrength, it has the characteristics that the tensile strength under 10% strain is more than 4 MPa, the elastic recovery under 10% strain is more than 98%, the tensile strength under 300% strain is more than 8 MPa, and a physical foaming process such as a carbon dioxide supercritical foaming process can be adopted to prepare the light foaming material. By adopting a carbon dioxide supercritical foaming process, the hydrogenated styrene/conjugated diolefin copolymer provided by the present disclosure can obtain a foaming material with excellent properties comprising the rebound elasticity more than 60% and the compression deformation less than 30%.

DETAILED DESCRIPTION

Figure 1:
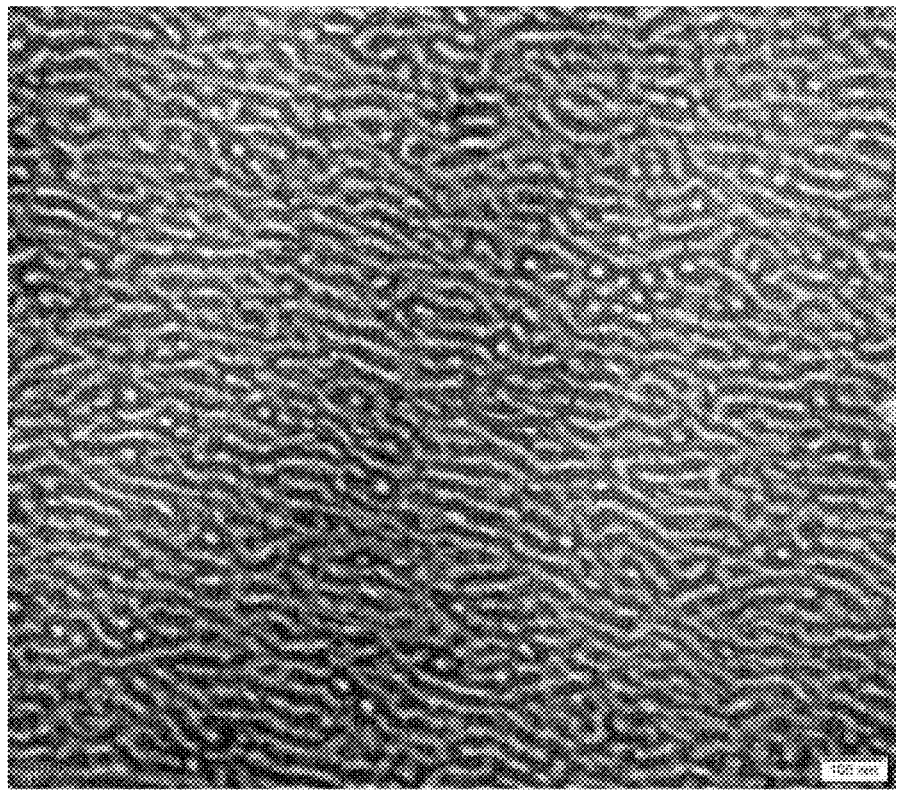
FIG. 1 is a TEM (Transmission Electron microscope) image of a hydrogenated styrene/conjugated diolefin copolymer provided in Example 1 of the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

According to the present disclosure, the styrene-based structural unit represented by Formula 1, the hydrogenated conjugated diene-based structural unit represented by Formula 2, and the hydrogenated conjugated diene-based structural unit represented by Formula 3 are respectively represented by the following Formula,

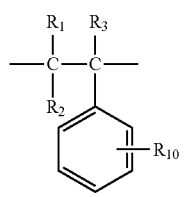

Formula 1

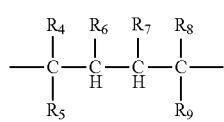

Formula 2

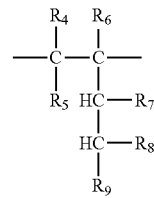

Formula 3

Wherein $R_1$, $R_2$, $R_3$, $R_4$, $R_5$, $R_6$, $R_7$, $R_8$ and $R_9$ are respectively H, $C_1$-$C_3$ alkyl, and $R_{10}$ is H or $C_1$-$C_4$ alkyl; wherein the $C_1$-$C_4$ alkyl may be methyl, ethyl, propyl, isopropyl, n-butyl, isobutyl and isobutyl for example.

In the present disclosure, $R_{10}$ represents a substituent on the benzene ring, and may be one or more, each of which is located at the ortho-position, meta-position or para-position, preferably the para-position relative to the vinyl group.

Preferably, the styrene-based structural unit is a styrene structural unit, that is, each of $R_1$, $R_2$ and $R_3$ is H, and $R_{10}$ is methyl, ethyl, propyl, isopropyl, n-butyl, isobutyl or tert-butyl. The conjugated diene-based structural unit is a butadiene structural unit and/or an isoprene structural unit, that is, each of $R_4$, $R_5$, $R_6$, $R_7$ and $R_8$ is H, $R_9$ is H or methyl.

In order to ensure high rebound elasticity and low compression deformability, the content of a styrene-based structural unit in the copolymer provided by the present disclosure shall not be more than 50 wt %. The inventors of the present disclosure have found that when the content of the conjugated diene-based structural unit is not less than 50 wt %, the hydrogenated copolymer macroscopically exhibits high tensile modulus and tensile strength as well as high elastic recovery at low strain, the reasons may be that the polyethylene chain in the molecular chain after hydrogenation of the conjugated diene-based structural unit is interrupted into a plurality of polyethylene crystal phases by the polystyrene-based structural unit, the polystyrene-based structural unit is squeezed to the surface of the material by the influence of the polyethylene chain segment crystal, and the cohesion of the copolymer is improved by the entanglement of chain segments in the polystyrene structural unit. The content of the styrene-based structural unit is 15-50 wt %, preferably 18-45 wt %, based on the total amount of the copolymer; and the content of the conjugated diene-based structural unit (i.e., based on the total amount of the hydrogenated conjugated diene-based structural unit represented by Formula 2 and the hydrogenated conjugated diene-based structural unit represented by Formula 3) is 50-85 wt %, preferably 55-82 wt %.

In order to ensure that the polymer has good tensile modulus and processability, the content of the hydrogenated conjugated diene-based structure unit (i.e., 1, 2-polymeric structure) represented by Formula 3 in the copolymer must also be strictly controlled. The content of the hydrogenated conjugated diene-based structural unit represented by Formula 3 is 8-32%, preferably 10-30%, more preferably 12-25%, based on the total amount of the hydrogenated conjugated diene-based structural unit represented by Formula 2 (i.e., 1, 4-polymeric structure) and the hydrogenated conjugated diene-based structural unit represented by Formula 3. In order to avoid ethylene crystallization which causes too large compression deformation, the conventional SEBS has a high content of the 1, 2-polymeric structure, the content is generally as high as 35% or more.

For the sake of ensuring that the polyethylene crystal phase in the conjugated diolefin structural unit chain link is uniformly distributed and the polystyrene chains are mutually entangled to form higher cohesive force after hydrogenation, thereby producing the properties of high rebound elasticity and low compression deformation, the randomness degree of the styrene-based structural unit and the hydrogenation degree of the copolymer must be strictly controlled. Wherein the present disclosure requires that the randomness degree of styrene-based structural units in the conjugated diene-based structural units is within a range of 30-80%, preferably 35-75%, and the hydrogenation degree of the copolymer is within a range of 85-100%, preferably 95-100%.

The present disclosure controls the 1,2-polymeric structure and 1,4-polymeric structure of the conjugated diolefin with specific content, converts the 1,4-polymeric structure into polyethylene structure after hydrogenation, ensures a certain amount of ethylene to perform crystallization and form a crystalline phase, thereby improve the strength and prevent aging.

In the present disclosure, the content of the styrene-based structural unit, the content of the 1,2-polymeric structural unit and hydrogenation degree can be calculated by $^1$H-nuclear magnetic resonance spectroscopy ($^1$H-NMR) using the following Formulas.

In the copolymer wherein each of the substituents $R_1$ to $R_{10}$ is H, $\delta 6.1$-$7.2$ is assigned to a proton on a benzene ring, $\delta 4.4$-$4.9$ belongs to a 1,2-polymeric structure, $\delta 4.9$-$5.8$ pertains to a 1,4-polymeric structure, $\delta 0.4$-$3.0$ is assigned to an alkane region, and $\delta$ 4.1-5.9 belongs to an alkene region.

$$5M_1+3M_2=A_{6.8-7.2};$$

$$2M_2=A_{6.1-6.8};$$

$$2M_3=A_{4.4-4.9};$$

$$2M_4+M_3=A_{4.1-5.9},$$

wherein Ax is the spectrum peak area corresponding to $\delta$ in the x range, $M_1$ is the relative mole fraction of non-block St, $M_2$ is the relative mole fraction of block St, $M_3$ and $M_4$ are the relative mole fractions of the 1,2-polymeric structure and 1,4-polymeric structure of butadiene, respectively.

According to the above affiliations, the total butadiene content of the copolymer (denoted by Bd) is as follows:

$$Bd=[A_{0.4-3.0}-3(M_1+M_2)-3M_3-4M_4]/8+(M_3+M_4) \quad (I);$$

The content of 1,2-polymeric structure=$M_3$/Bd (II);

The overall hydrogenation degree (denoted by H) of the copolymer is calculated as follows:

$$H=1-(M_3+M_4)/\{[A_{0.4-3.0}-3(M_1+M_2)-3M_3-4M_4]/8+(M_3+M_4)\} \quad (III).$$

Specific methods for obtaining the content of styrene-based structural unit, the content of 1,2-polymerization structural unit and hydrogenation degree can also be found in the Journal *ChinaSyntheticRubber Industry*, 2012-09-15, 53 (5): pp. 332-335, namely "Determination of hydrogenation degree and microstructure of styrene-ethylene-butadiene-styrene block copolymer by $^1$H-NMR", authors are BU Shao-hua, WU Chun-hong, et al.

In the present disclosure, the randomness degree of the styrene-based structural unit of the copolymer with each of the substituents $R_1$-$R_{10}$ being H in the conjugated diene-based structural unit is calculated and measured by a $^1$H-nuclear magnetic resonance spectroscopy ($^1$H-NMR) by adopting the following Formula:

$$\text{Randomness degree}=(A_{6.8-7.2}-X)/A_{6.1-7.2}$$

$A_{6.8-7.2}$ represents the peak areas of three protons at the para-position and the meta-position of a block benzene ring and five protons of non-block styrene, $A_{6.1-6.8}$ represents the peak areas of two protons at the ortho-position of a block benzene ring, X represents the peak areas corresponding to three protons at the para-position and the meta-position of a block benzene ring, $X/A_{6.1-6.8}=3/2$, and $A_{6.1-7.2}$ represents the peak areas of all protons on the benzene rings in the copolymer.

According to a preferred embodiment of the present disclosure, the hydrogenated styrene/conjugated diolefin copolymer has a crystallization temperature being 18° C. or more, preferably 18-70° C., and an enthalpy not less than 1.7 J/g, preferably 2.0-25.0 J/g both are measured by DSC with the DSC-Q10 thermal analyzer manufactured by the TA company according to the method in the National standard GB/T19466.3-2004 of the People's Republic of China (PRC), the metals Indium (In) and Stannum (Sn) are used for calibrating the temperature and enthalpy, nitrogen is presented for protection, the temperature rise is performed from −80° C. to 130° C. at the rate of 10° C./min, and the temperature drop is implemented from 130° C. to −80° C. at the rate of 2° C./min.

In order to obtain higher rebound elasticity and lower compression deformability, the molecular weight of the hydrogenated styrene/conjugated diolefin copolymer is within a range of 30,000-500,000, preferably 40,000-200,000.

In the present disclosure, unless otherwise specified, each of the molecular weights therein represents a number average molecular weight measured with a Gel Permeation Chromatography (GPC) measuring method.

Preferably, the hydrogenated styrene/conjugated diolefin copolymer of the present disclosure has a tensile strength at an elongation 300% being 8 MPa or more, preferably 10 to 20 MPa; a tensile strength at break being 30 MPa or more, preferably 30-60 MPa; an elongation at break within a range of 300-600%, preferably 350-500%; a hardness (Shore A) being 80 or more, preferably within a range of 80-98; a melt index or melt flow rate MFR (g/10 min, 200° C., 5 kg) within a range of 0-8, preferably 1-2.

In the present disclosure, the tensile strength at an elongation 300%, tensile strength at break, elongation at break and hardness (Shore A) are measured with the method of the National Standard GB/T528-2009 of the PRC.

The inventors of the present invention have found that a TEM image of the copolymer provided by the present disclosure is shown in FIG. 1. It can be seen from the TEM image that the micro-region structure (white portion in the figure) formed by the styrene-based structural unit represented by Formula 1 are dispersed in a manner that columnar distribution/spherical distribution and lamellar distribution coexistin micro-region structure (portions except for the white portion in the figure) formed by the hydrogenated conjugated diene-based structural unit represented by Formula 2 and the hydrogenated conjugated diene-based structural unit represented by Formula 3, such a phase structure endows the polymer with excellent mechanical properties.

Figure 2A:
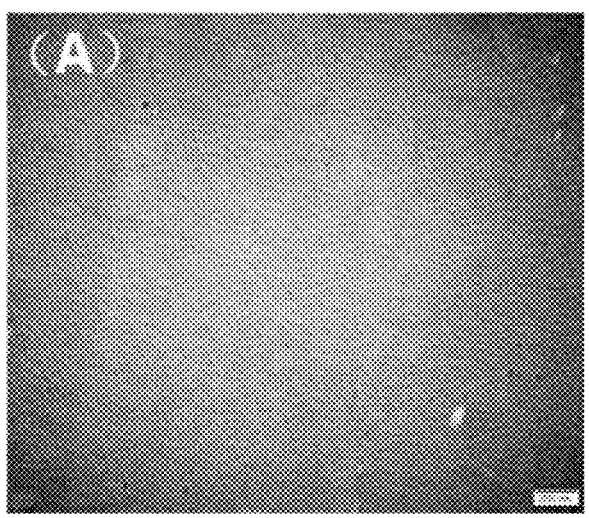
FIGS. 2A and 2B are TEM images of a conventional SEBS.
Figure 2B:
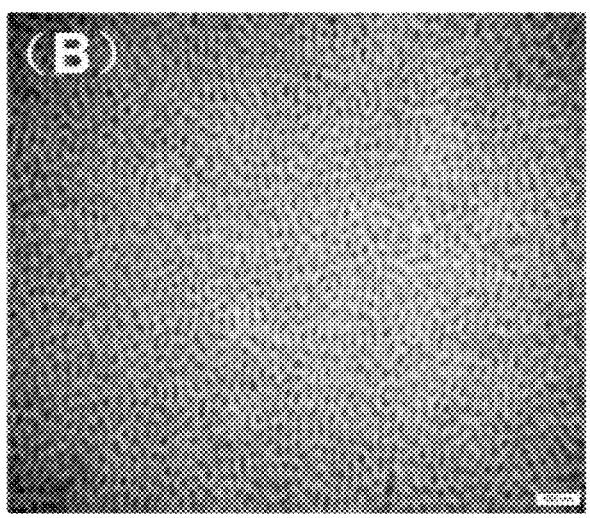

The traditional SEBS is a block copolymer, the tail end of each polybutadiene chain segment (PB) in its phase structure is connected with a polystyrene chain segment (PS), polybutadiene segments in the whole system are gathered together to form a soft segment which exhibits high elasticity of rubber, and the polystyrene segments are gathered together to form a hard segment which presents high hardness of plastic. The TEM image is shown in FIGS. 2A and 2B. As illustrated in FIGS. 2A and 2B, the polystyrene micro-region structure of the conventional SEBS merely exists in a spherical structure.

The hydrogenated styrene/conjugated diolefin random copolymer provided by the present disclosure can be foamed by means of a chemical foaming method or a physical foaming method to obtain a foaming material. For example, the physical foaming may be a foaming method using an inert gas such as carbon dioxide or nitrogen, preferably a carbon dioxide supercritical foaming, a nitrogen supercritical foaming, or the like. In regard to the foaming method using carbon dioxide, the carbon dioxide gas can be directly used, or can be generated in situ by a chemical method such as carbonate decomposition. The traditional styrene-butadiene copolymer must be foamed through chemical crosslinking so as to obtain a foaming material with rebound elasticity and compression deformation meeting the use requirements.

The hydrogenated styrene/conjugated diolefin copolymer provided by the present disclosure can be prepared by subjecting styrene and conjugated diolefin to anionic polymerization in order to obtain a copolymer of styrene and conjugated diolefin called base polymer, and then carrying out selective hydrogenation (i.e., the double bonds of conjugated diolefin units are hydrogenated and benzene rings are not hydrogenated) and purification in regard to the base polymer.

As an embodiment of the present disclosure, the synthesis step of the base polymer comprises the steps of adding a styrene monomer shown in the following Formula A, a conjugated diene-based monomer shown in the following Formula B, a solvent for polymerization, a molecular structure regulator and an alkyl lithium initiator into a polymerization autoclave under the oxygen-free and water-free conditions for performing random copolymerization to obtain the base polymer.

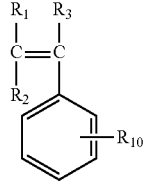

Formula A

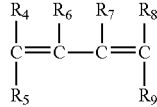

Formula B

Wherein the meanings and optional ranges of substituents $R_1$, $R_2$, $R_3$, $R_4$, $R_5$, $R_6$, $R_7$, $R_8$, $R_9$ and $R_{10}$ are the same as those mentioned above.

According to the present disclosure, the polymerization reaction may be individually implemented with the various polymerization solvents commonly used in the art, which are not particularly limited thereto, the solvent for polymerization may be, for example, a hydrocarbon solvent. Generally, the solvent for polymerization may be selected from $C_3$ to $C_{20}$ linear or branched chain or cyclic alkanes, preferably $C_4$ to $C_{20}$ linear or branched chain or cyclic alkanes, more preferably at least one selected from the group consisting of n-butane, isobutane, n-pentane, cyclopentane, n-hexane, cyclohexane, n-heptane, n-octane, n-nonane, n-decane and octane, further preferably one or more selected from the group consisting of cyclopentane, cyclohexane and n-hexane. The used amount of the solvent for polymerization is not particularly limited in the present disclosure, it may be conventionally selected in the art. Preferably, in the polymerization system of the step (1), the solvent for polymerization is used in such an amount that the initial total concentration of the monomers is within a range of 2-20 wt %, preferably 5-16 wt %.

Preferably, the alkyllithium initiator is at least one of n-butyllithium and sec-butyllithium.

Preferably, the used amount of the alkyllithium initiator is within a range of 0.5 mmol to 3 mmol relative to 100 g of the polymerization monomer (total amount of the styrene-based monomer and the conjugated diene-based monomer).

In the present disclosure, the molecular structure modifier is a composite modifier consisting of two or more Lewis bases, preferably at least one of the molecular structure modifiers is tetrahydrofuran, and preferably, the tetrahydrofuran accounts for 80 wt % or more, preferably 95 wt % or more of the total amount of the molecular structure modifiers. For example, the other Lewis bases may be tertiary amine compounds and one or more selected from the group consisting of other ether compounds such as ethyl ether, anisole, dioxane, dimethoxyethane, diethylene glycol dimethyl ether, ethylene glycol dibutyl ether, tetrahydrofurfural ethyl ether, divinyl-based ether, ethylene glycol ethyl tert-butyl ether, ethylene glycol propyl tert-butyl ether, ethylene glycol methyl tert-butyl ether, bistetrahydrofurfuryl propane, triethylamine, tetramethylethylenediamine and N-methylmorpholine, and are used in an amount of 2-30 mg/kg, more preferably 5-28 mg/kg, relative to the weight of the solvent for polymerization. The total concentration of the molecular structure regulator in the solvent system is preferably 350-650 mg/kg.

The various polymerization monomers can be added at one time, or added in batches or continuously pro rata, as long as the styrene-based monomers and the conjugated diene-based monomers exist in the reactor simultaneously and are subjected to random copolymerization.

The control on randomness degree of the base polymer is critical for ensuring high tensile strength of the polymer. Wherein, the dosage of the molecular structure regulator and the reaction temperature are key factors for controlling the randomness degree, thus the total dosage of the molecular structure regulator needs to be strictly controlled within the range of 350-650 mg/kg during the base polymer synthesis process, the dosage of tetrahydrofurfuran (THF) is 80 wt % or more, preferably 95 wt % or more of the total amount of the molecular structure regulator, and the reaction temperature is controlled to within the range of 55-100° C.

It is preferable that the polymerization reaction time is within a range of 45-120 min, preferably 60-90 min.

After the synthesis reaction of the base polymer is terminated, a cocatalyst and a nickel-based main catalyst or a titanium-based main catalyst are added for carrying out hydrogenation reaction in the presence of hydrogen to obtain a hydrogenated rubber solution.

The base polymer may be selectively hydrogenated by using the known process in the prior art, so as to hydrogenate the double bonds of the conjugated diolefin without hydrogenating the double bonds in the benzene ring. For example, the hydrogenation process disclosed in CN104945541B may be used, the content of which is incorporated herein by reference.

Preferably, the cocatalyst is used in an amount of 8-129 mg per 100 g of polymer.

Preferably, the main catalyst is used in an amount of 17-200 mg per 100 g of polymer.

Wherein, the amount of the polymer can be calculated according to the feeding amount of said monomers.

The cocatalyst is one or more selected from the group consisting of alcohols and esters, preferably one or more selected from the group consisting of monohydric alcohol, polyalcohol, linear alkyl ester-based compounds, benzoate-based compounds, phthalic acid ester-based compounds and p-hydroxybenzoic acid ester-based compounds; further preferably, one or more selected from the group consisting of monohydric alcohol of $C_1$-$C_{10}$, polyalcohol of $C_2$-$C_{10}$, linear alkyl ester-based compounds of $C_2$-$C_{10}$, benzoate-based compounds of $C_7$-$C_{15}$, phthalic acid ester-based compounds of $C_7$-$C_{15}$ and p-hydroxybenzoic acid ester-based compounds of $C_7$-$C_{15}$; most preferably, one or more selected from the group consisting of methanol, isooctanol, methyl benzoate, dimethyl phthalate and dibutyl phthalate.

Preferably, the hydrogenated rubber solution is subjected to reaction termination by soft water, then the hydrogenated rubber solution is subjected to purification to remove metal ion impurities therein, and subsequently the hydrogenated rubber solution is agglomerated by water vapor and dried and crushed to prepare the hydrogenated styrene/conjugated diolefin random copolymer. The metal ion impurities in the hydrogenated rubber solution can be removed by acidifying with tertiary decanoic acid, emulsifying and extracting with soft water, centrifugal separation, standing still and separating out the water phase. For example, the method described in CN201410063616.3 can be used for removing metal ions from the polymer, subjecting the rubber solution following the removal of metal ions to agglomeration with water vapor, recycling the solvent, drying and crushing the polymer particles to obtain the final product.

Preferably, the acidification conditions of the tertiary decanoic acid include the used amount of tertiary decanoic acid is 0.5-1 ml per 100 g of polymer, and an acidification time is within a range of 15-25 min.

Preferably, the conditions of emulsifying and extracting with soft water include the used amount of soft water is 50-100 ml per 100 g of polymer, and the emulsification time is within a range of 15-25 min.

Preferably, the conditions of agglomeration with water vapor comprise: introducing water vapor with a temperature of 110-130° C. into a 10 L condensation autoclave, and the agglomeration time is within a range of 20-40 min.

Preferably, the drying conditions include that the temperature of the air-blowing drying oven is set to within a range of 80-120° C. and the drying time is 1-4 h.

The present disclosure further provides a hydrogenated styrene/conjugated diolefin random copolymer foaming material, which is obtained by carbon dioxide supercritical foaming of the hydrogenated styrene/conjugated diolefin random copolymer.

The inventors of the present invention have innovatively discovered that the hydrogenated styrene/conjugated diolefin copolymer provided by the present disclosure may subject to carbon dioxide supercritical foaming to obtain a material with adjustable density within the range of 0.1-0.9 g/cm³ and variable hardness (Shore C) within the range of 5-85; the material also has the characteristics of high rebound elasticity, high shock absorption, low compression deflection, high slip resistance, yellowing resistance and no-emission of volatile organic compound (VOC). The material obtained by carbon dioxide supercritical foaming of the hydrogenated styrene/conjugated diolefin random copolymer provided by the present disclosure has the rebound elasticity of 58-65% measured according to the standard ASTM-D2632 stipulated by the American Society for Testing Material (ASTM) and the compression deformation of 20-28% measured according to the National Standard GB/T6669-2008 of the PRC.

The inventors of the present invention have also discovered through research that the hydrogenated styrene/conjugated diolefin copolymer, along with at least one of white oil, polyolefin, inorganic filler, SEBS (hydrogenated styrene-butadiene block copolymer), and SEPS (hydrogenated styrene-isoprene block copolymer) used as an ingredient, subject to carbon dioxide supercritical foaming, such a process is conducive to further improve properties of the foaming material.

Wherein the weight ratio of the hydrogenated styrene/conjugated diolefin copolymer to the ingredient can be 5-10:1.

The conditions for carbon dioxide supercritical foaming include a foaming pressure which may be, for example, 10-30 MPa, and a foaming temperature which may be, for example, within a range of 110-140° C.

The foaming material may be a wire rod, a sectional material, a sheet material, or the like.

The present disclosure also provides a use of the hydrogenated styrene/conjugated diolefin copolymer foaming material in preparation of foaming soles and the like.

The foamed sole prepared from the material obtained by foaming the hydrogenated styrene/conjugated diolefin copolymer provided by the present disclosure has the characteristics of high rebound elasticity and low compression deformation. Compared with the foamed sole made of the traditional SEBS and EVA foaming materials, the foamed sole provided by the present disclosure has the advantages of higher rebound elasticity and lower compression permanent deformation.

The following examples further illustrate the present disclosure, but are not intended to limit thereto.

In the following examples, the molecular weight and distribution of the polymer were measured by gel permeation chromatography with a LCD-10ADvp gel chromatograph manufactured by the Shimadzu Corporation in Japan, the detector was a RID-10A differential refraction detector, the separation columns were GPC 804 and 805; the flow rate of THF with a mobile phase was 1 mL/min, the test temperature was the ambient temperature, the standardization was performed with monodisperse polystyrene, and the data was processed with Shimadzu CR-7A.

The content of the styrene-based structural unit, the content of the 1,2-polymeric structure, the hydrogenation degree and the randomness degree were obtained by calculation according to the $^1$H-NMR, and were measured with an instrument Bruker AV400 spectrometer (400 MHz) at normal temperature, and the $CDCl_3$ was used as a solvent.

The mechanical properties of the polymer (tensile strength at an elongation 300%, tensile strength at break, elongation at break and the like) were measured with the method in the National Standard GB/T528-2009 of the PRC.

The Melt Flow Rate (MFR) was measured with the method in the National Standard GB/T3682.1-2018 (200° C., 5 kg) of the PRC.

The DSC spectrogram was measured with the DSC-Q10 thermal analyzer manufactured by the TA company according to the method in the National standard GB/T19466.3-2004 of the PRC, the metals Indium (In) and Stannum (Sn) were used for calibrating the temperature and enthalpy, nitrogen was presented for protection, the temperature rise was performed from −80° C. to 130° C. at the rate of 10°

C./min, and the temperature drop was implemented from 130° C. to −80° C. at the rate of 2° C./min.

The rebound elasticity of the foaming material was measured according to the standard ASTM-D2632, the compression deformation was measured according to the National Standard GB/T6669-2008 of the PRC, the dry friction coefficient and the wet friction coefficient were measured according to the standard ASTM-F609, the density was measured according to National Standard GB/T6343-2009 of the PRC, and the oxidative induction time (OIT) was measured according to the National Standard GB/T2951.9-1997 of the PRC.

Example 1

The base polymer (the S/B mass ratio of the base polymer is 35/65) was synthesized by polymerization of anions, and the base polymer was subsequently selectively hydrogenated by a titanium-based catalyst to prepare the copolymer, the method specifically comprised the following steps:

Step (1-a): Synthesis of Base Polymer 3,000 mL of pure cyclohexane (water value less than 20 mg/kg), tetrahydrofuran with an amount equivalent to 350 mg/kg of solvent and tetrahydrofurfuryl ethyl ether with an amount equivalent to 5 mg/kg of solvent were added into a 5 L polymerization autoclave which had been replaced by high-purity nitrogen gas, a stirring process was started, the temperature was raised to 60° C., 6.0 mmol of n-butyl lithium was added, then a mixed monomer consisting of 195 g of butadiene and 105 g of styrene was added into the polymerization autoclave in an one-time adding mode, the reaction temperature was controlled to be below 100° C., and then the reaction was carried out at 70° C. for 50 min to obtain a polymerization adhesive solution.

Step (1-b): Hydrogenation of Base Polymer

The polymerization adhesive solution was introduced into the 5 L hydrogenation autoclave, it was heated to 70° C., 4 mL (0.2 mol/L) of cocatalyst dibutyl phthalate and 0.2 g of main catalyst dicyclopentadiene titanium dichloride were added, hydrogen was introduced, the hydrogenation pressure was controlled at 1.5 MPa, and the hydrogenation reaction was performed for 2 hours.

Step (1-c): Purification of Rubber Solution

After the hydrogenation reaction was finished, the hydrogenated rubber solution was transferred to a washing autoclave, the temperature was raised to 60-65° C., tertiary decanoic acid was used for removing metal lithium in the adhesive solution, 300 mL of soft water was then used for emulsifying and extracting for 15 min, subjecting to centrifuge separation, standing still, and separating out a water phase, the residual adhesive solution was agglomerated with water vapor, and dried to prepare the hydrogenated styrene/butadiene copolymer. The properties of the copolymer were shown in Table 1.

A TEM image of the prepared hydrogenated styrene/butadiene copolymer was shown in FIG. 1. As can be seen from FIG. 1, both the lamellar structure and the columnar/spherical structures were present in the TEM image of the hydrogenated styrene/butadiene copolymer.

Figure 3:
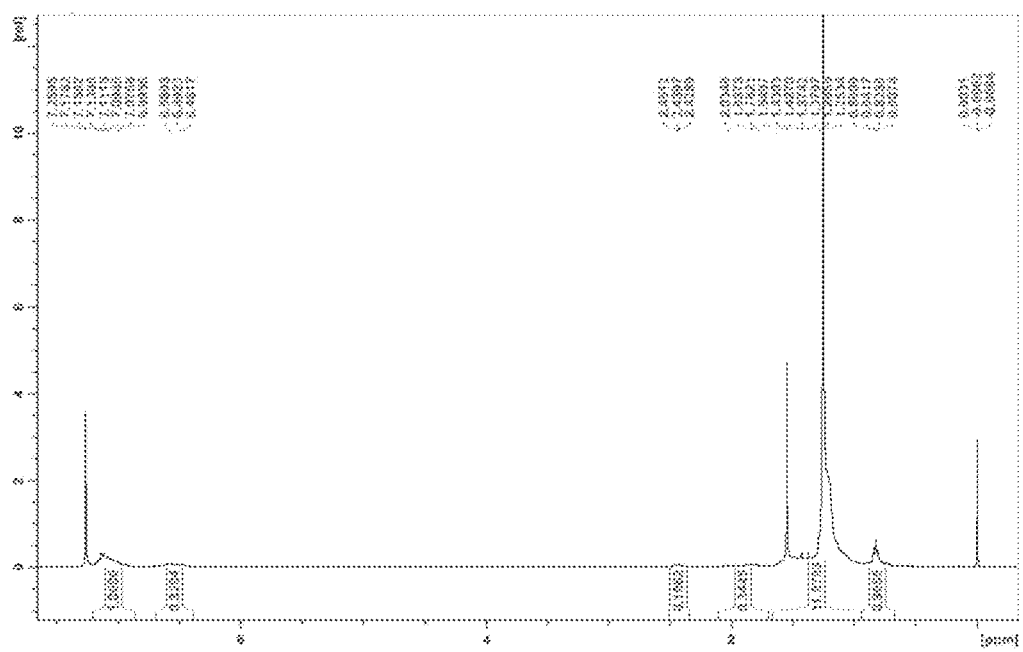
FIG. 3 illustrates the $^1$H-nuclear magnetic resonance spectroscopy (NMR) spectrum of a hydrogenated styrene/conjugated diolefin copolymer provided in Example 1 of the present disclosure.

The $^1$HNMR spectrum of the resulting hydrogenated styrene/butadiene copolymer was shown in FIG. 3. Hydrogenated structure can be seen from FIG. 3, and the calculation results of its microstructure, hydrogenation degree and randomness were shown in Table 1.

Figure 4A:
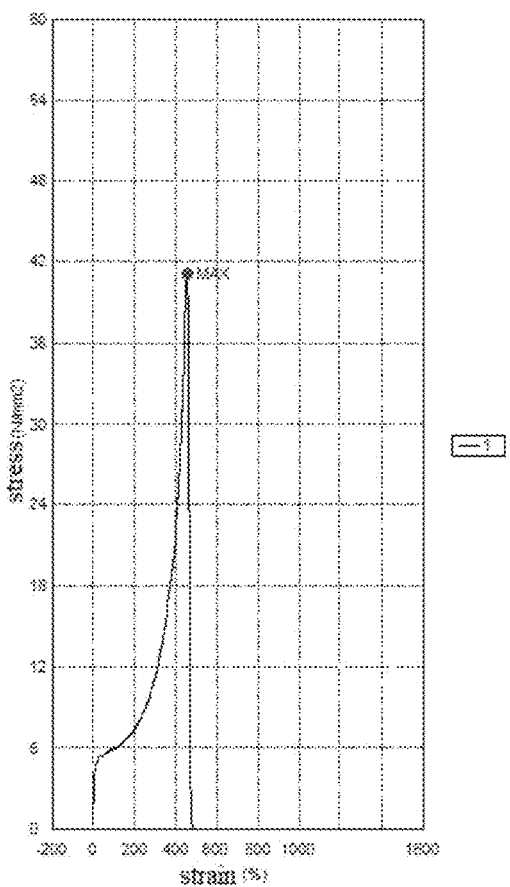
FIG. 4A illustrates a stress-strain curve of the hydrogenated styrene/conjugated diolefin copolymer provided in Example 1 of the present disclosure.
Figure 4B:
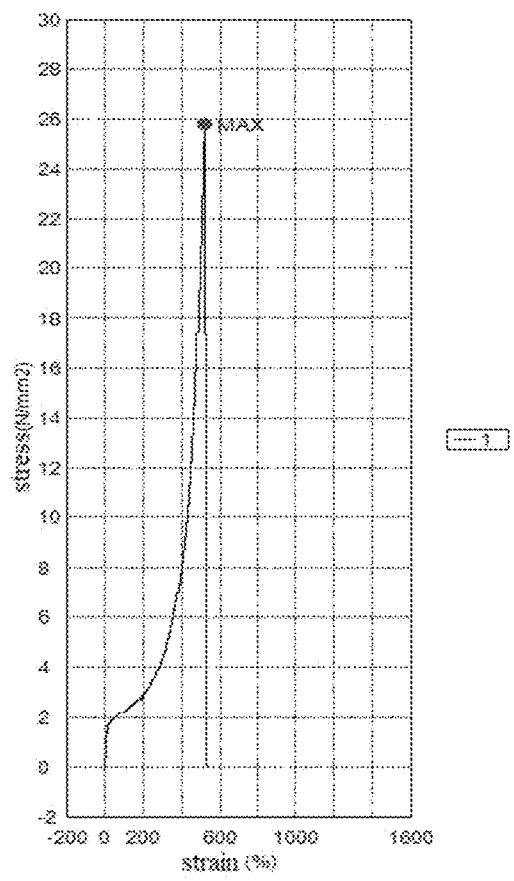
FIG. 4B shows a stress-strain curve of commercially available SEBS.

The stress-strain curve of the hydrogenated styrene/butadiene copolymer was shown in FIG. 4. At can be seen from FIGS. 4A and 4B, the hydrogenated copolymer provided by the present disclosure had a tensile strength of 41 MPa or more, the tensile strength at an elongation 300% of 11 MPa or more, and exhibited high tensile modulus and tensile strength at an elongation 300%.

Figure 5A:
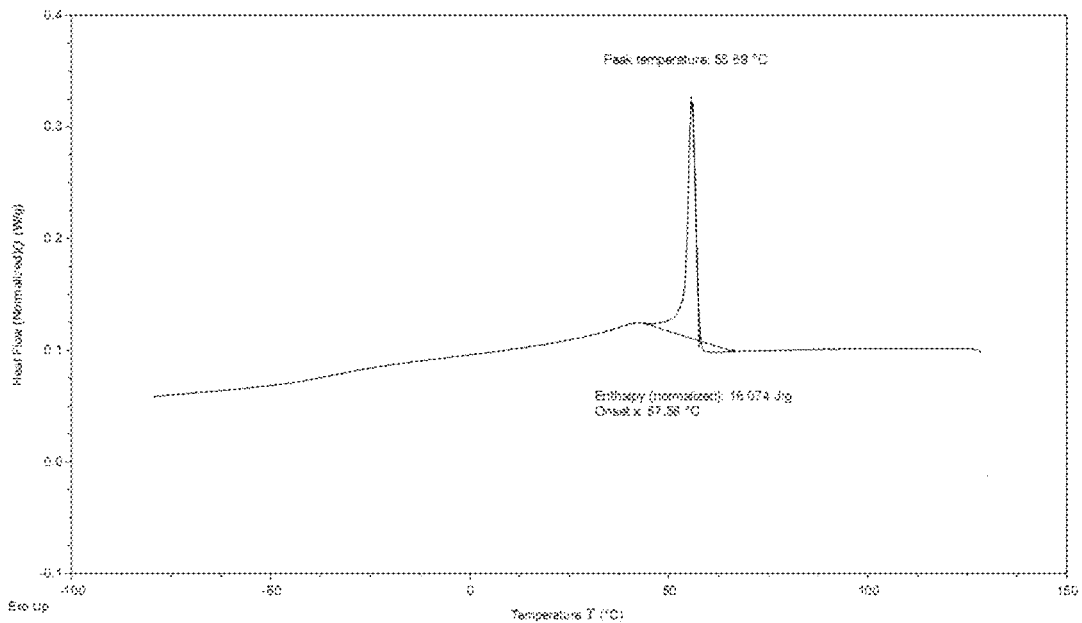
FIG. 5A shows the DSC curve for the hydrogenated styrene/conjugated diolefin copolymer provided in Example 1 of the present disclosure.

The DSC curve of the resulting hydrogenated styrene/butadiene copolymer was shown in FIG. 5A. As can be seen from FIGS. 5A and 5B, the hydrogenated copolymer of the present disclosure had a crystallization temperature about 55° C. and an enthalpy about 20 J/g.

Example 2

A polymer was synthesized according to the method of Example 1, except for that a base polymer having an S/B mass ratio of 30/70 was synthesized by polymerization of anions, the specific synthesis operations of the base polymer were as follows:

3,000 mL of pure cyclohexane (water value less than 20 mg/kg), tetrahydrofuran with an amount equivalent to 450 mg/kg of solvent and tetramethylethylenediamine with an amount equivalent to 10 mg/kg of solvent were added into a 5 L polymerization autoclave which had been replaced by high-purity nitrogen gas, a stirring process was started, the temperature was raised to 60° C., 6.0 mmol of n-butyl lithium was added, then a mixed monomer consisting of 210 g of butadiene and 90 g of styrene was added into the polymerization autoclave in an one-time adding mode, the reaction temperature was controlled to be below 100° C., and then the reaction was carried out at 70° C. for 55 min to obtain a polymerization adhesive solution. The adhesive solution was hydrogenated and purified according to the method of Example 1 to prepare a copolymer having the properties shown in Table 1. The TEM image was similar to Example 1.

Example 3

A polymer was synthesized according to the method of Example 1, except for that a base polymer having an S/B mass ratio of 20/80 was synthesized by polymerization of anions, the specific synthesis operations of the base polymer were as follows:

3,000 mL of pure cyclohexane (water value less than 20 mg/kg), tetrahydrofuran with an amount equivalent to 550 mg/kg of solvent and bis-tetrahydrofurfuryl propane with an amount equivalent to 15 mg/kg of solvent were added into a 5 L polymerization autoclave which had been replaced by high-purity nitrogen gas, a stirring process was started, the temperature was raised to 60° C., 6.0 mmol of n-butyl lithium was added, then a mixed monomer consisting of 240 g of butadiene and 60 g of styrene was added into the polymerization autoclave in an one-time adding mode, the reaction temperature was controlled to be below 100° C., and then the reaction was carried out at 70° C. for 55 min to obtain a polymerization adhesive solution. The adhesive solution was hydrogenated and purified according to the method of Example 1 to prepare a copolymer having the properties shown in Table 1. The TEM image was similar to Example 1.

Example 4

A polymer was synthesized according to the method of Example 1, except for that a base polymer having an S/B mass ratio of 45/55 was synthesized by polymerization of anions, the specific synthesis operations of the base polymer were as follows:

3,000 mL of pure cyclohexane (water value less than 20 mg/kg), tetrahydrofuran with an amount equivalent to 500 mg/kg of solvent and tetrahydrofurfuryl ethyl ether with an amount equivalent to 12 mg/kg of solvent were added into a 5 L polymerization autoclave which had been replaced by high-purity nitrogen gas, a stirring process was started, the temperature was raised to 60° C., 6.0 mmol of n-butyl lithium was added, then a mixed monomer consisting of 165 g of butadiene and 135 g of styrene was added into the polymerization autoclave in an one-time adding mode, the reaction temperature was controlled to be below 100° C., and then the reaction was carried out at 70° C. for 55 min to obtain a polymerization adhesive solution. The adhesive solution was hydrogenated and purified according to the method of Example 1 to prepare a copolymer having the properties shown in Table 1. The TEM image was similar to Example 1.

Example 5

A base polymer (having an S/B mass ratio of 38/62) was synthesized by polymerization of anions, a copolymer was prepared by further selectively hydrogenating the base polymer with a titanium-based catalyst, the specific operations comprised the following steps:

Step (1-a): Synthesis of Base Polymer 3,000 mL of pure cyclohexane (water value less than 20 mg/kg), tetrahydrofuran with an amount equivalent to 550 mg/kg of solvent and tetrahydrofurfuryl ethyl ether with an amount equivalent to 25 mg/kg of solvent were added into a 5 L polymerization autoclave which had been replaced by high-purity nitrogen gas, a stirring process was started, the temperature was raised to 60° C., 10.0 mmol of n-butyl lithium was added, then a mixed monomer consisting of 186 g of butadiene and 114 g of styrene was added into the polymerization autoclave in an one-time adding mode, the reaction temperature was controlled to be below 100° C., and then the reaction was carried out at 70° C. for 55 min to obtain a polymerization adhesive solution.

Step (1-b): Hydrogenation of Base Polymer

The process was same as in Example 1.

Step (1-c): Purification of Adhesive Solution

The process was same as in Example 1. A hydrogenated styrene/butadiene copolymer was prepared, the properties of the copolymer were shown in Table 1.

Example 6

A polymer was synthesized according to the method of Example 1, except for that a base polymer having an S/B mass ratio of 25/75 was synthesized by polymerization of anions, the specific synthesis operations of the base polymer were as follows:

3,000 mL of pure cyclohexane (water value less than 20 mg/kg), tetrahydrofuran with an amount equivalent to 580 mg/kg of solvent and ditetrahydrofurfuryl propane with an amount equivalent to 20 mg/kg of solvent were added into a 5 L polymerization autoclave which had been replaced by high-purity nitrogen gas, a stirring process was started, the temperature was raised to 60° C., 6.0 mmol of n-butyl lithium was added, then a mixed monomer consisting of 225 g of butadiene and 75 g of styrene was added into the polymerization autoclave in an one-time adding mode, the reaction temperature was controlled to be below 100° C., and then the reaction was carried out at 70° C. for 55 min to obtain a polymerization adhesive solution. The adhesive solution was hydrogenated and purified according to the method of Example 1 to prepare a copolymer having the properties shown in Table 1. The TEM image was similar to Example 1.

Example 7

A polymer was synthesized according to the method of Example 1, except for that a base polymer having an S/B mass ratio of 32/68 was synthesized by polymerization of anions, the specific synthesis operations of the base polymer were as follows:

3,000 mL of pure cyclohexane (water value less than 20 mg/kg), tetrahydrofuran with an amount equivalent to 580 mg/kg of solvent and ditetrahydrofurfuryl propane with an amount equivalent to 25 mg/kg of solvent were added into a 5 L polymerization autoclave which had been replaced by high-purity nitrogen gas, a stirring process was started, the temperature was raised to 60° C., 4.0 mmol of n-butyl lithium was added, then a mixed monomer consisting of 204 g of butadiene and 96 g of styrene was added into the polymerization autoclave in an one-time adding mode, the reaction temperature was controlled to be below 100° C., and then the reaction was carried out at 70° C. for 55 min to obtain a polymerization adhesive solution. The adhesive solution was hydrogenated and purified according to the method of Example 1 to prepare a copolymer having the properties shown in Table 1. The TEM image was similar to Example 1.

Comparative Example 1

The preparation of the styrene/butadiene copolymer was carried out according to the method in Example 2 of CN102083872B.

Comparative Example 2

The preparation of a styrene/butadiene copolymer was performed according to the method in Example 2 of CN102083872B, the hydrogenation and purification of the copolymer were then carried out in accordance with the steps (1-b) and (1-c) in the above-mentioned Example 1 of the present disclosure.

Comparative Example 3

The preparation of a hydrogenated styrene/butadiene copolymer was carried out in accordance with the method of Example 2, except for that a base polymer having an S/B mass ratio of 60/40 was synthesized.

Comparative Example 4

Figure 5B:
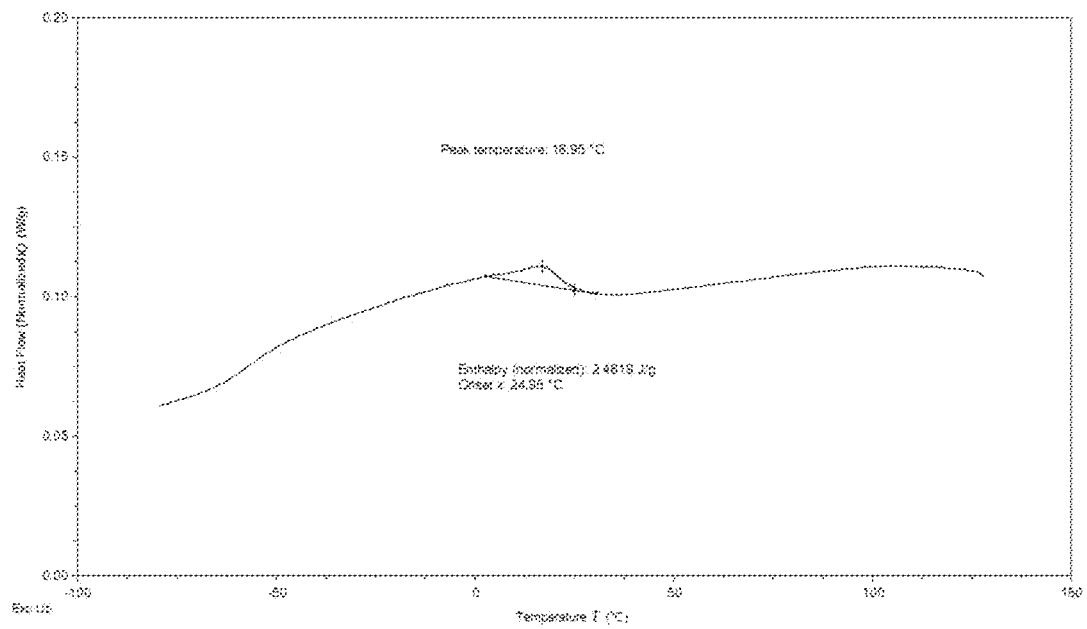
FIG. 5B illustrates the DSC curve for commercially available SEBS.

The TEM image of the conventional SEBS product (hydrogenated styrene-butadiene-styrene tri-block copolymer with S/B weight ratio of 33/67, the content of 1,2-polymeric structure was within a range of 36.5-37.5%, the number average molecular weight was 198,000) was shown in FIGS. 2A and 2B. As can be seen from FIGS. 2A and 2B, only spherical structures were present therein. The stress-strain curve was shown as FIG. 4B. As can be seen from FIGS. 4A and 4B, the commercially available product SEBS had a tensile strength about 20 MPa, which was much lower than that of the copolymer of the present disclosure. The DSC curve was shown in FIG. 5B. As illustrated in FIGS. 5A and 5B, the commercially available product SEBS had a crystallization temperature about 16° C. and an enthalpy of 2.6 J/g.

Comparative Example 5

A base polymer (having an S/B mass ratio of 38/62) was synthesized by polymerization of anions, a copolymer was prepared by further selectively hydrogenating the base polymer with a titanium-based catalyst, the specific operations comprised the following steps:

Step (1-a): Synthesis of Base Polymer 3,000 mL of pure cyclohexane (water value less than 20 mg/kg) and bis-tetrahydrofurfuryl propane with an amount equivalent to 250 mg/kg of solvent were added into a 5 L polymerization autoclave which had been replaced by high-purity nitrogen gas, a stirring process was started, the temperature was raised to 60° C., 8.0 mmol of n-butyl lithium was added, then a mixed monomer consisting of 186 g of butadiene and 114 g of styrene was added into the polymerization autoclave in an one-time adding mode, the reaction temperature was controlled to be below 100° C., and then the reaction was carried out at 80° C. for 60 min to obtain a polymerization adhesive solution.

Step (1-b): Hydrogenation of Base Polymer
The process was same as in Example 1.

Step (1-c): Purification of Adhesive Solution
The process was same as in Example 1. A hydrogenated styrene/butadiene copolymer was prepared, the properties of the copolymer were shown in Table 1.

Comparative Example 6

A base polymer (having an S/B mass ratio of 38/62) was synthesized by polymerization of anions, a copolymer was prepared by further selectively hydrogenating the base polymer with a titanium-based catalyst, the specific operations comprised the following steps:

Step (1-a): Synthesis of Base Polymer
The process was same as in Example 1.

Step (1-b): Hydrogenation of Base Polymer

The polymerization adhesive solution was introduced into a 5 L hydrogenation autoclave, it was heated to 70° C., 4 mL (0.1 mol/L) of cocatalyst dibutyl phthalate and 0.1 g of main catalyst dicyclopentadiene titanium dichloride were added, hydrogen was introduced, the hydrogenation pressure was controlled at 1.0 MPa, and the hydrogenation reaction was performed for 1 hour.

Step (1-c): Purification of Adhesive Solution
The process was same as in Example 1. A hydrogenated styrene/butadiene copolymer was prepared, the properties of the copolymer were shown in Table 1.

Comparative Example 7

A base polymer (having an S/B mass ratio of 30/70) was synthesized by polymerization of anions, a copolymer was prepared by further selectively hydrogenating the base polymer with a titanium-based catalyst, the specific operations comprised the following steps:

Step (1-a): Synthesis of Base Polymer 3,000 mL of pure cyclohexane (water value less than 20 mg/kg) and tetrahydrofuran with an amount equivalent to 200 mg/kg of solvent were added into a 5 L polymerization autoclave which had been replaced by high-purity nitrogen gas, a stirring process was started, the temperature was raised to 70° C., 8.0 mmol of n-butyl lithium was added, then a mixed monomer consisting of 210 g of butadiene and 90 g of styrene was added into the polymerization autoclave in an one-time adding mode, the reaction temperature was controlled to be below 100° C., and then the reaction was carried out at 80° C. for 60 min to obtain a polymerization adhesive solution.

Step (1-b): Hydrogenation of Base Polymer
The process was same as in Example 1.

Step (1-c): Purification of Adhesive Solution
The process was same as in Example 1. A hydrogenated styrene/butadiene copolymer was prepared, the properties of the copolymer were shown in Table 1.

The results of the performance test of the synthesized samples of Examples 1-7 and Comparative Examples 1-7 were shown in Table 1 below.

TABLE 1

| Examples | Example | | | | | |
|---|---|---|---|---|---|---|
| | 1 | 2 | 3 | 4 | 6 | 7 |
| S/B | 35/65 | 30/70 | 20/80 | 45/55 | 38/62 | 25/75 | 32/68 |
| Content of 1,2-polymeric structure, % | 18.8 | 19.3 | 20.8 | 19.0 | 23.5 | 24.2 | 25.8 |
| Hydrogenation degree, % | 96.2 | 96.0 | 96.8 | 97.2 | 96.9 | 97.1 | 99.7 |
| Randomness degree, % | 39.4 | 52.4 | 67.8 | 63.7 | 68.1 | 68.6 | 70.2 |
| Crystallization temperature, ° C. | 25.5 | 41.6 | 55.7 | 40.9 | 21.1 | 22.3 | 26.9 |
| Enthalpy, J/g | 4.2 | 6.9 | 20.6 | 3.6 | 3.0 | 2.8 | 2.6 |
| Number average molecular weight, in an unit of 10,000 | 6.5 | 6.7 | 6.3 | 6.2 | 3.5 | 6.0 | 9.8 |
| tensile strength at an elongation 300%, MPa | 11.3 | 10.8 | 11.9 | 9.8 | 8.5 | 8.7 | 8.8 |
| Tensile strength at break, MPa | 41.1 | 41.2 | 42.8 | 32.1 | 34.2 | 35.7 | 31.4 |
| Elongation at break, % | 455 | 453 | 462 | 430 | 444 | 477 | 469 |
| Hardness, Shore A | 91 | 91 | 89 | 95 | 89 | 90 | 91 |
| MFR, g/10 min | 1.13 | 1.45 | 1.32 | 1.55 | 2.46 | 1.17 | 0.85 |
| TEM features | Coexistence of lamellar and columnar forms | | | | | | |
| Oxidation induction time (OIT), min | 69.6 | 58.8 | 63.9 | 61.7 | 64.2 | 63.6 | 62.8 |

| Examples | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| S/B | 30/70 | 30/70 | 60/40 | 33/67 | 38/62 | 38/62 | 30/70 |
| Content of 1,2-polymeric structure, % | 15.6 | 15.6 | 18.2 | 36.8 | 37.3 | 19.0 | 6.2 |
| Hydrogenation degree, % | 0 | 98.2 | 97.1 | 99.0 | 97.7 | 80.0 | 97.8 |
| Randomness degree, % | 95.1 | 95.1 | 68.0 | 0.8 | 84.8 | 40.1 | 20.3 |
| Crystallization temperature, ° C. | None | None | 28.3 | 16.9 | None | 24.1 | 45.1 |

TABLE 1-continued

| | | | | | | | |
|---|---|---|---|---|---|---|---|
| Enthalpy, J/g | None | None | 1.5 | 2.6 | None | 3.9 | 18.2 |
| Number average molecular weight, in an unit of 10,000 | 14.0 | 14.0 | 6.0 | 19.8 | 5.1 | 5.3 | 4.9 |
| tensile strength at an elongation 300%, MPa | 0.4 | 0.5 | 4.7 | 4.3 | 1.8 | 1.1 | 8.0 |
| Tensile strength at break, MPa | 1.1 | 1.8 | 15.7 | 25.8 | 8.3 | 6.9 | 25.0 |
| Elongation at break, % | 467 | 544 | 577 | 521 | 655 | 567 | 499 |
| Hardness, Shore A | Undetectable | | 95 | 73 | 79 | 80 | 95 |
| MFR, g/10 min | 2.13 | 1.46 | 1.87 | None | 2.31 | 3.48 | 3.12 |
| TEM features | None | None | Lamellar | Spherical | Spherical | Spherical | Spherical |
| Oxidation induction time (OIT), min | 3.8 | 10.6 | 22.0 | 18.5 | 20.6 | 13.2 | 49.0 |

Note:
"none" in the crystallization temperature and enthalpy indicates that the crystallization peak is invisible in the DSC curve, "none" in the TEM features indicates that any one of the lamellar, columnar, or spherical structure is invisible in the TEM image, "undetactable" indicates that the polymer is too soft, and no data is detected with the shore Ahardmeter.

As can be seen from the results of Table 1 above, the copolymner provided by the present disclosure had desirable mechanical properties and oxidation resistance.

Performance Test

1) The copolymers prepared in Examples 1-7 and Comparative Examples 1-7 were blended and granulated in an extruder, the granulating conditions included that the granulation temperature (handpiece temperature) was 200° C.; the hydrogenated styrene/butadiene copolymer particles (with a particle size of 0.5-1 cm) were then immersed in a supercritical fluid of carbon dioxide such that the supercritical fluid attained a dissolution equilibrium in the matrix of the hydrogenated styrene/butadiene copolymer particles, the hydrogenated styrene/butadiene copolymer particles were subsequently placed in a high-pressure reaction autoclave and heated for foaming under the foaming conditions including a foaming pressure of 20 MPa and a foaming temperature of 120° C., to obtain the hydrogenated styrene/butadiene copolymer foamed particles. The foamed particles were molded through a mold to form a foamed sheet (with a thickness about 1 cm), and the performance test results of the foamed sheet were shown in the following Table 2.

2) The copolymers prepared in Examples 1-4 and Comparative Examples 1-3 were blended with white oil (26 #, Shandong Lifeng Chemical New Material Co., Ltd.), polypropylene (YanshanPetrochemical Corporation, k8303), CaCO3, SEBS (BalingPetrochemical Corporation, YH503) or SEPS (BalingPetrochemical Corporation, YH 4053), and the formulation was shown in Table 3. The blend was subjected to $CO_2$ supercritical foaming under the foaming conditions including a foaming pressure of 20 MPa and a foaming temperature 120° C., so as to obtain the hydrogenated styrene/butadiene copolymer foamed particles. The foamed particles were molded through a mold to form a foamed sheet (with a thickness about 1 cm), and the performance test results of the foamed sheet were shown in the following Table 4.

TABLE 2

| Examples | Example 1 | Example 2 | Example 3 | Example 4 | Example 5 | Example 6 | Example 7 |
|---|---|---|---|---|---|---|---|
| S/B | 35/65 | 30/70 | 20/80 | 45/55 | 38/62 | 25/75 | 32/68 |
| Rebound elasticity, % | 62 | 61 | 65 | 61 | 62 | 60 | 64 |
| Compression deformation, % | 23 | 20 | 20 | 24 | 21 | 23 | 21 |
| Hardness, Shore C | 46 | 40 | 35 | 48 | 47 | 40 | 41 |
| Dry friction coefficient | 0.60 | 0.65 | 0.62 | 0.63 | 0.62 | 0.64 | 0.63 |
| Wet friction coefficien | 0.20 | 0.21 | 0.20 | 0.23 | 0.22 | 0.21 | 0.20 |
| Density, g/cm³ | 0.24 | 0.21 | 0.19 | 0.27 | 0.26 | 0.20 | 0.23 |

| Examples | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| S/B | 30/70 | 30/70 | 60/40 | 33/67 | 38/62 | 38/62 | 30/70 |
| Rebound elasticity, % | 9 | 12 | 33 | 50 | 38 | 30 | 41 |
| Compression deformation, % | 72 | 70 | 50 | 35 | 32 | 34 | 45 |
| Hardness, Shore C | 12 | 15 | 55 | 45 | 44 | 47 | 49 |
| Dry friction coefficient | 0.51 | 0.49 | 0.49 | 0.49 | 0.53 | 0.48 | 0.46 |
| Wet friction coefficient | 0.12 | 0.12 | 0.10 | 0.10 | 0.12 | 0.11 | 0.13 |
| Density, g/cm³ | 0.22 | 0.34 | 0.32 | 0.32 | 0.31 | 0.35 | 0.38 |

TABLE 3

| | Source of copolymer | | | | | |
|---|---|---|---|---|---|---|
| | Copolymer | White oil | Polypropylene | CaCO₃ | SEBS | SEPS |
| Example1 | 85 | 10 | 5 | 10 | 0 | 0 |
| Example2 | 80 | 8 | 2 | 10 | 5 | 5 |
| Example3 | 80 | 8 | 2 | 20 | 10 | 0 |
| Example4 | 80 | 8 | 2 | 20 | 0 | 10 |
| C. Ex. 1 | 85 | 10 | 5 | 10 | 0 | 0 |
| C. Ex. 2 | 85 | 10 | 5 | 10 | 0 | 0 |
| C. Ex. 3 | 85 | 10 | 5 | 10 | 0 | 0 |

TABLE 4

| Example | Example1 | Example2 | Example3 | Example4 | C. Ex. 1 | C. Ex. 2 | C. Ex. 3 |
|---|---|---|---|---|---|---|---|
| S/B | 35/65 | 30/70 | 20/80 | 45/55 | 30/70 | 30/70 | 60/40 |
| Rebound elasticity, % | 60 | 63 | 63 | 65 | 20 | 13 | 25 |
| Compression deformation, % | 30 | 28 | 28 | 28 | 65 | 73 | 51 |
| Hardness, Shore C | 48 | 46 | 46 | 45 | 12 | 17 | 57 |
| Dry friction coefficient | 0.58 | 0.57 | 0.57 | 0.56 | 0.52 | 0.51 | 0.53 |
| Wet friction coefficient | 0.20 | 0.21 | 0.21 | 0.20 | 0.11 | 0.13 | 0.10 |
| Density, g/cm$^3$ | 0.30 | 0.35 | 0.35 | 0.34 | 0.34 | 0.47 | 0.42 |

As can be seen from the results in Table 2, the present disclosure can obtain a foaming material having a high rebound elasticity and a low compression deformation by foaming the copolymer obtained with carbon dioxide by controlling the specific content of styrene, the specific content of 1,2-polymeric structure, and the particular hydrogenation degree and randomness degree of the hydrogenated copolymer.

As indicated by the results in Table 2 and Table 4, the density and hardness of the foam are slightly improved by the addition of the filler in the Formula adhesive of the hydrogenated copolymer in the present disclosure, the rebound elasticity and compression set properties of the foaming material are still desirable.

The invention claimed is:

1. A hydrogenated styrene/conjugated diolefin copolymer, wherein the copolymer comprises a styrene-based structural unit represented by Formula 1, a hydrogenated conjugated diene-based structural unit represented by Formula 2, and a hydrogenated conjugated diene-based structural unit represented by Formula 3,

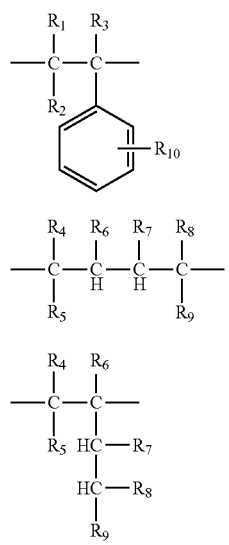

wherein $R_1$, $R_2$, $R_3$, $R_4$, $R_5$, $R_6$, $R_7$, $R_8$, and $R_9$ are respectively H, C1-C3 alkyl, and $R_{10}$ is H or C1-C4 alkyl; the content of the styrene-based structural unit is 15-50 wt %, based on the total amount of the copolymer; the content of the hydrogenated conjugated diene-based structural unit represented by Formula 3 is 8-32 wt %, based on the total amount of the hydrogenated conjugated diene-based structural unit represented by Formula 2 and the hydrogenated conjugated diene-based structural unit represented by Formula 3, the randomness degree of the styrene-based structural unit in the hydrogenated conjugated diene-based structural unit is 30-80%, and the hydrogenation degree of the conjugated diolefin in the copolymer is 85-100%.

2. The hydrogenated styrene/conjugated diolefin copolymer of claim 1, wherein the content of the styrene-based structural unit is 25-35 wt %, based on the total amount of the copolymer; the content of the hydrogenated conjugated diene-based structural unit represented by Formula 3 is 10-30 wt %, based on the total amount of the hydrogenated conjugated diene-based structural unit represented by Formula 2 and the hydrogenated conjugated diene-based structural unit represented by Formula 3; the randomness degree of the styrene-based structural unit in the hydrogenated conjugated diene-based structural unit is 35-75%, and the hydrogenation degree of the conjugated diolefin in the copolymer is 95-100%.

3. The hydrogenated styrene/conjugated diolefin copolymer of claim 1, wherein the hydrogenated styrene/conjugated diolefin copolymer has a crystallization temperature of 18° C. or more measured by DSC, and an enthalpy not less than 1.7 J/g.

4. The hydrogenated styrene/conjugated diolefin copolymer of claim 1, wherein a micro-region structure formed by the styrene-based structural unit represented by Formula 1 and a micro-region structure formed by the hydrogenated conjugated diolefin structural unit represented by Formula 2 and the hydrogenated conjugated diolefin structural unit represented by Formula 3 coexist in a columnar, spherical and lamellar distribution.

5. The hydrogenated styrene/conjugated diolefin copolymer of claim 1, wherein the styrene-based structural unit represented by Formula 1, the hydrogenated conjugated diolefin structural unit represented by Formula 2, and the hydrogenated conjugated diolefin structural unit represented by Formula 3 are a structural unit represented by the following Formula 1-1, a structural unit represented by the following Formula 2-1, and a structural unit represented by the following Formula 3-1, respectively

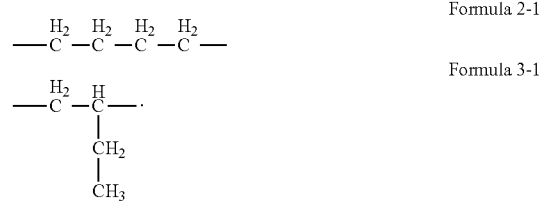

6. The hydrogenated styrene/conjugated diolefin copolymer according to claim 1, wherein the copolymer has a number average molecular weight within a range of 30,000-500,000, as measured by gel chromatography.

7. The hydrogenated styrene/conjugated diolefin copolymer of claim 1, wherein the copolymer has a tensile strength at an elongation 300% of 8 MPa or more; a tensile strength at break of 30 Mpa or more; an elongation at break within a range of 300-600%; a Shore A hardness being 80 or more, and a Melt FLow Rate at 200° C., 5 kg within a range of 0-8 g/10 min.

8. A foaming material obtained by foaming the hydrogenated styrene/conjugated diolefin copolymer of claim 1.

9. The foaming material of claim 8, wherein the foaming material has a rebound elasticity within a range of 58-65% measured according to the standard ASTM-D2632, and a compression deformation within a range of 20-28% measured according to the standard GB/T6669-2008.

10. The foaming material of claim 8, wherein the foaming is supercritical carbon dioxide foaming or supercritical nitrogen gas foaming.

11. A method for preparing foamed shoe soles, the method comprising utilizing the hydrogenated styrene/conjugated diolefin copolymer of claim 1.

12. The hydrogenated styrene/conjugated diolefin copolymer of claim 1, wherein the content of the styrene-based structural unit is 18-45 wt %, based on the total amount of the copolymer.

13. The hydrogenated styrene/conjugated diolefin copolymer of claim 1, wherein the content of the hydrogenated conjugated diene-based structural unit represented by Formula 3 is 12-25 wt %, based on the total amount of the hydrogenated conjugated diene-based structural unit represented by Formula 2 and the hydrogenated conjugated diene-based structural unit represented by Formula 3.

14. The hydrogenated styrene/conjugated diolefin copolymer of claim 2, wherein the content of the hydrogenated conjugated diene-based structural unit represented by Formula 3 is 12-25 wt %, based on the total amount of the hydrogenated conjugated diene-based structural unit represented by Formula 2 and the hydrogenated conjugated diene-based structural unit represented by Formula 3.

15. The hydrogenated styrene/conjugated diolefin copolymer of claim 1, wherein the hydrogenated styrene/conjugated diolefin copolymer has a crystallization temperature of 18-70° C. measured by DSC, and an enthalpy of 2-25 J/g.

16. The hydrogenated styrene/conjugated diolefin copolymer according to claim 1, wherein the copolymer has a number average molecular weight within a range of 40,000-200,000, as measured by gel chromatography.

17. The hydrogenated styrene/conjugated diolefin copolymer according to claim 1, wherein the copolymer has a number average molecular weight within a range of 50,000-80,000, as measured by gel chromatography.

18. The hydrogenated styrene/conjugated diolefin copolymer of claim 1, wherein the copolymer has a tensile strength at an elongation 300% of 10-20 Mpa; a tensile strength at break of 30-60 MPa; an elongation at break within a range of 350-500%; a Shore A hardness being within a range of 80-98, and a Melt Flow Rate at 200 C., 5 kg within a range of 1-2 g/10 min.

19. The foaming material of claim 8, wherein the foaming material is obtained by physically foaming.

* * * * *